(12) United States Patent
Imamura et al.

(10) Patent No.: US 10,668,800 B2
(45) Date of Patent: Jun. 2, 2020

(54) DRIVE UNIT FOR VEHICLES

(71) Applicant: TOYOTA JIDOSHA KABUSHIKI KAISHA, Toyota-shi, Aichi (JP)

(72) Inventors: Tatsuya Imamura, Toyota (JP); Atsushi Tabata, Toyota (JP); Koichi Okuda, Toyota (JP); Keita Imai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 277 days.

(21) Appl. No.: 15/743,513

(22) PCT Filed: Aug. 10, 2015

(86) PCT No.: PCT/JP2015/072693
§ 371 (c)(1),
(2) Date: Jan. 10, 2018

(87) PCT Pub. No.: WO2017/010018
PCT Pub. Date: Jan. 19, 2017

(65) Prior Publication Data
US 2018/0208044 A1    Jul. 26, 2018

(30) Foreign Application Priority Data
Jul. 10, 2015  (JP) .................................. 2015-138619

(51) Int. Cl.
*B60K 6/38* (2007.10)
*B60K 6/445* (2007.10)
(Continued)

(52) U.S. Cl.
CPC ................ *B60K 6/445* (2013.01); *B60K 6/26* (2013.01); *B60K 6/365* (2013.01); *B60K 6/38* (2013.01);
(Continued)

(58) Field of Classification Search
CPC .......... B60K 6/445; B60K 20/50; B60K 6/26; B60K 6/405; B60K 28/165; B60K 6/48;
(Continued)

(56) References Cited

U.S. PATENT DOCUMENTS 5,562,565 A * 10/1996 Moroto .................... B60K 6/26
180/65.6
9,527,375 B2 * 12/2016 Clark ....................... B60K 6/26
(Continued)

FOREIGN PATENT DOCUMENTS

| CN | 104661846 A | 5/2015 |
|---|---|---|
| JP | S62-221806 A | 9/1987 |

(Continued)

Primary Examiner — Patrick H Mackey
(74) Attorney, Agent, or Firm — Oliff PLC

(57) ABSTRACT

A vehicle drive unit to prevent a single phase lock of a motor as a prime mover to limit damage is provided. The drive unit includes: a first transmission route to deliver drive force of an engine to drive wheels; and a second transmission route to deliver drive force of a motor to the drive wheels. The second transmission route comprises an intermediate shaft that transmits the drive force of the motor to the first transmission route. A fluid coupling is disposed between the motor and the intermediate shaft. A lockup clutch is arranged parallel to the fluid coupling between the motor and the intermediate shaft.

11 Claims, 4 Drawing Sheets

(51) Int. Cl.

| | |
|---|---|
| *B60K 6/405* | (2007.10) |
| *B60K 6/26* | (2007.10) |
| *B60W 20/50* | (2016.01) |
| *B60W 30/184* | (2012.01) |
| *B60W 10/02* | (2006.01) |
| *B60K 6/365* | (2007.10) |
| *B60K 6/48* | (2007.10) |
| *B60K 28/16* | (2006.01) |
| *B60L 3/00* | (2019.01) |
| *B60W 10/08* | (2006.01) |
| *F16H 45/02* | (2006.01) |

(52) U.S. Cl.
CPC ............... *B60K 6/405* (2013.01); *B60K 6/48* (2013.01); *B60K 28/165* (2013.01); *B60L 3/003* (2013.01); *B60W 10/023* (2013.01); *B60W 10/026* (2013.01); *B60W 10/08* (2013.01); *B60W 20/50* (2013.01); *B60W 30/1843* (2013.01); *B60L 2240/36* (2013.01); *B60W 2510/087* (2013.01); *B60W 2710/024* (2013.01); *B60Y 2200/92* (2013.01); *B60Y 2400/426* (2013.01); *F16H 2045/0252* (2013.01); *Y02T 10/6221* (2013.01); *Y02T 10/6239* (2013.01); *Y02T 10/7022* (2013.01); *Y02T 10/7077* (2013.01); *Y02T 10/7275* (2013.01)

(58) Field of Classification Search
CPC . B60K 6/365; B60W 10/026; B60W 30/1843; B60W 20/50; B60W 10/08; B60W 10/023; B60L 3/003
See application file for complete search history.

(56) References Cited

U.S. PATENT DOCUMENTS

| | | | |
|---|---|---|---|
| 9,561,719 B2* | 2/2017 | Lo | ............... B60K 6/387 |
| 10,183,567 B2* | 1/2019 | Suyama | ............... B60K 6/36 |
| 10,232,698 B2* | 3/2019 | Miyagawa | ............ B60K 6/442 |
| 2010/0203996 A1* | 8/2010 | Kawai | ............... B60K 6/445 |
| | | | 475/5 |
| 2013/0277163 A1 | 10/2013 | Ideshio et al. | |
| 2014/0094342 A1* | 4/2014 | Kobayashi | ............... B60K 6/48 |
| | | | 477/5 |
| 2015/0251530 A1 | 9/2015 | Okuda et al. | |

FOREIGN PATENT DOCUMENTS

| | | | |
|---|---|---|---|
| JP | 2006-256560 A | | 9/2006 |
| JP | 2009-035212 A | | 2/2009 |
| JP | 2011-231857 A | | 11/2011 |
| JP | 2013-193613 A | | 9/2013 |
| JP | 2014-201289 A | | 10/2014 |
| JP | 2014201289 A | * | 10/2014 |
| WO | 2012/070119 A1 | | 5/2012 |

* cited by examiner

DRIVE UNIT FOR VEHICLES

TECHNICAL FIELD

This invention relates to the art of a drive unit for a vehicle in which a prime mover includes at least one motor.

BACKGROUND ART

Japanese Patent Laid-Open No. 2006-256560 describes a power output unit in which a motor as a prime mover is connected to a transmission, and in which a torque is delivered to a right derive wheel and a left drive wheel through a differential gear. If the motor generates a large drive force when stopping or when rotated at a low speed, one of coils of specific phase would be heated by overcurrent. Such phenomenon is called a "single phase lock". In order to avoid the single phase lock, according to the teachings of Japanese Patent Laid-Open No. 2006-256560, an engagement device such as a brake of a transmission is controlled in such a manner as to cause a slip, and the motor is controlled in such a manner as to generate a target drive torque.

Japanese Patent Laid-Open No. 2011-231857 describes a driving device having a motor-generator serving as a prime mover. In the driving device, the motor-generator is connected to a torque converter having a normal-close type lockup clutch that is normally applied to transmit a torque.

In the power output unit taught by Japanese Patent Laid-Open No. 2006-256560, the motor is rotated while reducing a torque transmitting capacity of the engagement device to avoid the single phase lock so that the power of the motor is partially consumed in the form of friction heat. However, if the motor is thus rotated while causing a slip in the engagement device, the engagement device would be damaged by the friction heat. Such damage on the engagement device may be limited by reducing friction of the engagement device. However, if the friction of the engagement device is reduced, a rotational speed of the motor cannot be raised to avoid the single phase lock. Otherwise, the engagement device is almost released and hence a drive torque cannot be transmitted sufficiently to propel the vehicle. In the driving device taught by Japanese Patent Laid-Open No. 2011-231857, a motor-generator is also used as a prime mover. However, Japanese Patent Laid-Open No. 2011-231857 does not disclose a possibility of the single phase lock and a means to avoid the single phase lock.

DISCLOSURE OF THE INVENTION

The present disclosure has been conceived nothing the foregoing technical problems, and it is therefore an object of the present disclosure is to provide a drive unit for vehicles configured to increase a relative rotational speed to a rotating electrical machine such as a motor or a motor-generator serving as a prime mover, while preventing a temperature rise and thermal damage.

According to the present disclosure, there is provided a drive unit for a vehicle, comprising: a first transmission route to deliver a drive force generated by an engine to drive wheels; and a second transmission route to deliver a drive force generated by a rotating electrical machine to the drive wheels. in order to achieve the above-mentioned objective, the second transmission route comprises an intermediate shaft that transmits the drive force generated by the rotating electrical machine to the first transmission route, and a fluid coupling is disposed between the rotating electrical machine and the intermediate shaft.

According to the present disclosure, the first transmission route may comprise an input shaft extending coaxially with a rotational center axis of the engine, the intermediate shaft may extends parallel to the input shaft, a rear case may be situated in a leading end side of the input shaft and the intermediate shaft that is opposite to the engine in an axial direction, and the fluid coupling may be connected to the leading end portion of the intermediate shaft while being adjacent to an inner face of the rear case.

According to the present disclosure, a rear adapter that is diametrically larger than the fluid coupling may be attached detachably to the rear case to close a portion of the rear case opposed to a leading end of the intermediate shaft.

According to the present disclosure, an engagement element that is engaged to transmit the drive force and disengaged to interrupt transmission of the drive force may be arranged parallel to the fluid coupling between the rotating electrical machine and the intermediate shaft.

According to the present disclosure: the rotating electrical machine may comprise a rotor shaft; the intermediate shaft may penetrate through the rotor shaft along a rotational center axis of the rotor shaft; the fluid coupling may comprise a pump impeller connected to the rotor shaft, and a turbine runner connected to the intermediate shaft; the engagement element may be disposed in such a manner as to selectively connect the pump impeller and the intermediate shaft; the engagement element, the fluid coupling, and the rotating electrical machine are arranged in order on the intermediate shaft; and an output member that delivers the drive force generated by the rotating electrical machine to the drive wheels is disposed on other end portion of the intermediate shaft that is opposite to the leading end portion to which the fluid coupling is connected.

According to the present disclosure, the pump impeller may be connected to the rotor shaft through a spline.

According to the present disclosure, the turbine runner may be connected to the intermediate shaft through a spline.

According to the present disclosure, the drive unit may further comprise a casing that holds the first transmission route and the second transmission route. A first bulkhead that supports the rotor shaft may be formed in the casing, and the fluid coupling may be contacted to the first bulkhead in a rotatable and slidable manner. A first oil passage may be formed in the first bulkhead to feed and discharge oil to/from the fluid coupling.

According to the present disclosure, a second oil passage may be formed in the intermediate shaft along an axial direction of the intermediate shaft to feed and discharge oil to/from the fluid coupling.

According to the present disclosure, a second bulkhead that supports the intermediate shaft may be formed in the casing, and the intermediate shaft may be contacted to the second bulkhead in a rotatable and slidable manner. A third oil passage may be formed in the second bulkhead to be connected to the second oil passage.

According to the present disclosure, the first transmission route may further comprise: a power split mechanism that performs a differential action among a first rotary element, a second rotary element, and a third rotary element; and another rotating electrical machine. A power of the engine may be transmitted to the first rotary element, a power of said another rotating electrical machine may be transmitted to the second rotary element, and the drive force may be delivered from the third rotary element to the drive wheels.

According to the present disclosure, there is provided a drive unit for a vehicle, in which a motor serves as a prime mover, and a drive force generated by the motor is delivered to drive wheels. In the drive unit: a fluid coupling may be disposed between the motor and the drive wheels; an engagement element that is engaged to transmit the drive force and disengaged to interrupt transmission of the drive force may be arranged parallel to the fluid coupling; the motor may include a synchronous motor; and the engagement element may be adapted to perform a differential rotation when a rotational speed of the motor is lower than a predetermined speed, and a required drive force is smaller than a predetermined drive force.

According to the present disclosure, the predetermined drive force may be set smaller than a maximum torque of the synchronous motor.

Thus, according to the present disclosure, the second transmission route to deliver the drive force of the rotating electrical machine to the drive wheels is formed separately from the first transmission route to deliver the drive force of the engine to drive wheels. In a case that the rotating electrical machine generates the drive force, the drive force is delivered from the rotating electrical machine to the drive wheel through the fluid coupling if a rotational speed is low and an output torque is large. Consequently, slip is caused in the fluid coupling so that a relative speed to an output shaft speed is increased. For this reason, the rotational speed of the rotating electrical machine is not restricted to a low speed to avoid the occurrence of the single phase lock in the rotating electrical machine. The fluid coupling may be heated as a result of causing the slip, the heat of the fluid coupling is transported to outside by fluid (i.e., oil) circulated between the fluid coupling and an external device. For this reason, temperature rise in the fluid coupling may be suppressed, and thermal damages on the fluid coupling and the drive unit may be limited. In addition, only the drive force of the rotating electrical machine is applied to the fluid coupling, and the drive force of the engine will not be applied to the fluid coupling. For this reason, the fluid coupling may be downsized thereby downsizing the drive unit entirely According to the present disclosure, the fluid coupling is disposed coaxially with the intermediate shaft extending parallel to the input shaft while being adjacent to the rear case. Therefore, number of parts arranged on the rotational center axis of the engine can be reduced to reduce an axial length of the drive unit.

Since the rear case may be partially opened and closed by the rear adapter, fluid coupling may be inserted easily into the drive unit. That is, the drive unit may be assembled easily.

Since the engagement element is arranged parallel to the fluid coupling, the torque can be transmitted efficiently between the rotating electrical machine and the intermediate shaft by engaging the engagement element.

As described, the engagement element, the fluid coupling, the rotating electrical machine, and the output member are arranged in order on the intermediate shaft. That is, the engagement element and the fluid coupling may be connected to the leading end of the intermediate shaft penetrating through the rotational center axis of the rotating electrical machine. For this reason, restrictions on inner diameters of the engagement element and the fluid coupling may be reduced thereby downsizing the drive unit entirely.

According to the present disclosure, since the pump impeller and the turbine runner of the fluid coupling is splined onto the rotor shaft and the intermediate shaft, the drive unit may be assembled easily.

As also described, according to the present disclosure, the oil passages are formed in the bulkheads. For this reason, oil leakage can be reduced and number of sites to be sealed can be reduced. In addition, post-process for forming the oil passages can be simplified.

Further, even if the fluid coupling is disposed close to the rear case, the rear adapter may be arranged in the rear case and an arrangement of the oil passages can be simplified by forming the oil passage for supplying and discharging the oil to/from the fluid coupling in the intermediate shaft.

Furthermore, according to the present disclosure, only the motor is used as a prime mover. In this case, the occurrence of the single phase lock may also be avoided while maintaining the drive force by causing a slip in the fluid coupling.

DESCRIPTION OF THE PREFERRED EMBODIMENT(S)

Figure 1:
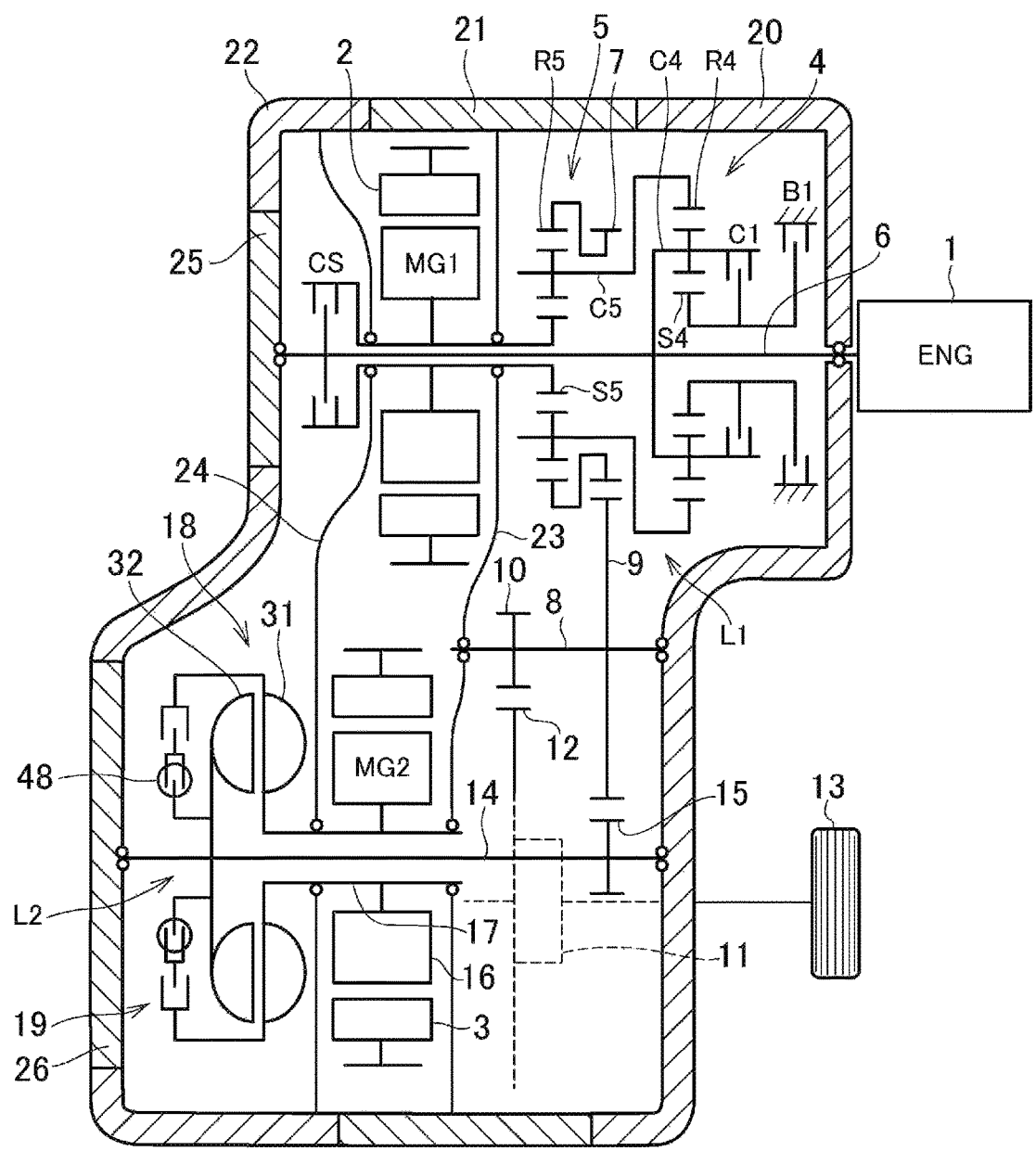
FIG. 1 is a skeleton diagram showing one embodiment of the present disclosure.

FIG. 1 is a skeleton diagram showing one embodiment of a two-motor type hybrid drive unit to which the present disclosure is applied. A prime mover includes an engine 1 and two motors 2, 3. The first motor 2 serves as a rotating electrical machine of the embodiment, and the second motor 3 serves as another rotating electrical machine of the embodiment. An internal combustion engine such as a gasoline engine and a diesel engine may be employed as the engine 1 (ENG), and a permanent magnet type three-phase synchronous motor such as a motor-generator (MG1, MG2) may be employed as each of the motors 2 and 3.

An overdrive mechanism 4, a power split mechanism 5, and the first motor-generator (MG1) 2 are arranged in order coaxially with the engine 1. In order to increase a speed of the engine 1, a single-pinion planetary gear set is used as the overdrive mechanism 4. Specifically, the overdrive mechanism 4 includes a sun gear S4, a ring gear R4 arranged coaxially with the sun gear S4, a plurality of pinion gears interposed between the sun gear S4 and the ring gear R4, and a carrier C4 supporting the pinion gears in a rotatable and revolvable manner. The carrier C4 is connected to an input shaft 6 extending coaxially with a rotational center axis of the engine 1 to transmit a drive force generated by the engine 1. A first clutch C1 is arranged to selectively connect the sun gear S4 to the carrier C4, and a brake B1 is arranged to selectively halt the sun gear S4. When the first clutch C1 is engaged, a so-called direct stage (low) in which a speed ratio is "1" is established so that the overdrive mechanism 4 is rotated entirely integrally. By contrast, when the brake B1 is engaged to stop a rotation of the sun gear S4, a so-called overdrive stage (high) in which a speed ratio is smaller than "1" is established so that a rotational of the ring gear R4 is increased higher than that of the carrier C4. When both of the first clutch C1 and the brake B1 are engaged, the overdrive mechanism 4 is halted entirely so that a rotation of the engine 1 is stopped. By contrast, when both of the first clutch C1 and the brake B1 are disengaged, the sun gear S4 is allowed to rotate freely and hence the overdrive mechanism 4 will not transmit the torque.

The ring gear R4 serves as an output element to transmit power to the power split mechanism 5. In the embodiment shown in FIG. 1, a single-pinion planetary gear set is also used as the power split mechanism 5. Specifically, the power split mechanism 5 includes a sun gear S5, a ring gear R5 arranged coaxially with the sun gear R5, a plurality of pinion gears interposed between the sun gear S5 and the ring gear R5, and a carrier C5 supporting the pinion gears in a rotatable and revolvable manner. The carrier C4 is connected to the ring gear R4 of the overdrive mechanism 4. In the power split mechanism 5, the ring gear R5 is connected to an output gear 7 to serve as an output element, and the sun gear S5 is connected to the first motor-generator 2 to serve as a reaction element. In the embodiment of the present disclosure, the carrier C5 serves as a first rotary element, the sun gear S5 serves as a second rotary element, and the ring gear R5 serves as a third rotary element.

The sun gear S5 is integrated with a sun gear shaft, and the input shaft 6 penetrates through the sun gear shaft while being allowed to rotate. A second clutch CS is arranged to selectively connect the input shaft 6 to the sun gear S5. The second clutch CS is manipulated to establish a series mode.

A countershaft 8 extends parallel to the input shaft 6, and a diametrically-larger driven gear 9 and a diametrically-smaller drive gear 10 are fitted onto the countershaft 8 to be rotated integrally therewith. The driven gear 9 is meshed with the output gear 7, and the drive gear 10 is meshed with a ring gear 12 of a differential gear set 11 as a final reduction. The drive force delivered to the differential gear set 11 is distributed to both of the drive wheels 13. Thus, a gear train formed of the driven gear 9 and the drive gear 10 serves as a speed reduction mechanism.

According the embodiment, the engine 1, the overdrive mechanism 4, the power split mechanism 5, the driven gear 9 and the drive gear 10 formed on the countershaft 8, the differential gear set 11, serve as a first transmission route L1 to deliver the drive force to the drive wheels 13.

A drive force of the second motor-generator (MG2) 3 as another rotating electrical machine of the embodiment is delivered to the drive wheels 13 via a second transmission route L2. In order to form the second transmission route L2, an intermediate shaft 14 extends parallel to the input shaft 6 and the countershaft 8. A drive gear 15 is fitted onto one end (i.e., in the right side in FIG. 1) of the intermediate shaft 14 while being meshed with the driven gear 9.

The intermediate shaft 14 penetrates through a rotor shaft 17 integrated with a rotor 16 of the second motor-generator 3, and the other end of the intermediate shaft 14 is connected to the rotor shaft 17 through a fluid coupling 18. In addition, a lockup clutch (i.e., a clutch mechanism) 19 is arranged parallel to the fluid coupling 18. The fluid coupling 18 and the lockup clutch 19 will be explained later in more detail.

Thus, the fluid coupling 18 or the lockup clutch 19, the intermediate shaft 14, and the drive gear 15, serve as the second transmission route L2 to deliver the power of the second motor-generator 3 to the driven gear 9. That is, the second transmission route L2 branches from the first transmission route L1 at the driven gear 9. Accordingly, although the fluid coupling 18 is subjected to the drive force generated by the second motor-generator 3, the drive force generated by the engine 1 will not be applied to the fluid coupling 18.

A casing holding the transmission routes L1 and L2 is generally divided into a housing 20, a middle case 21, and a rear case 22. The housing 20 is situated closest to the engine 1 in the axial direction of the engine 1, and closed toward the engine 1 by a side wall and opened toward the other side. The middle case 21 is a cylindrical member attached to an opening end of the housing 20, and an internal space thereof is divided into two spaces by a bulkhead 23. The bulkhead 23 serves as a second bulkhead of the embodiment, and the overdrive mechanism 4, the power split mechanism 5, the driven gear 9 and the drive gear 10 formed on the countershaft 8, and the drive gear 15 fitted onto the intermediate shaft 14 are held in a space (or a chamber) between the bulkhead 23 and the housing 20. A sun gear shaft formed integrally with the sun gear S5 penetrates through the bulkhead 23, and the input shaft 6 penetrates through the sun gear shaft. End portions of the countershaft 8 are supported by the housing 20 and the bulkhead 23, and one of end portions of the intermediate shaft 14 is also supported by the housing 20. Here, the differential gear set 11 may be held not only in the space between the bulkhead 23 and the housing 20 but also in a separated chamber (not shown).

The rear case 22 is attached to an opening end of the middle case 21 in the opposite side of the engine 1 to close the casing, and an internal space of the rear case 22 is divided into two spaces by a bulkhead 24. The rear case 22 includes a rear adapter 25 that can open and close a portion of the rear case 22 opposed to a leading end of the input shaft 6, and a rear adapter 26 that can open and close a portion of the rear case 22 opposed to a leading end of the intermediate shaft 14 and that is diametrically larger than the fluid coupling 18. The first motor-generator 2 and the second motor-generator 3 are held in a space between the bulkhead 23 of the middle case 21 and the bulkhead 24 of the rear case 22. The rotor shaft integrated with the rotor of the first motor-generator 2 or the sun gear shaft connected to the rotor shaft is supported by the bulkheads 23 and 24. The rotor shaft 17 of the second motor-generator 3 is also supported by the bulkheads 23 and 24, and the intermediate shaft 14 penetrates through the rotor shaft 17. Accordingly, the bulkhead 24 serves as a first bulkhead of the embodiment.

The second clutch CS is held in a space between the bulkhead 24 and the rear adapter 25 of the rear case 22, and the input shaft 6 or a shaft integrated therewith is supported by the rear adapter 25. The fluid coupling 18 and the lockup clutch 19 are held in a space between the bulkhead 24 and another rear adapter 26 (while being adjacent to an inner face of the rear case 22), and the fluid coupling 18 is supported by the bulkhead 24 and the rear adapter 26.

Figure 2:
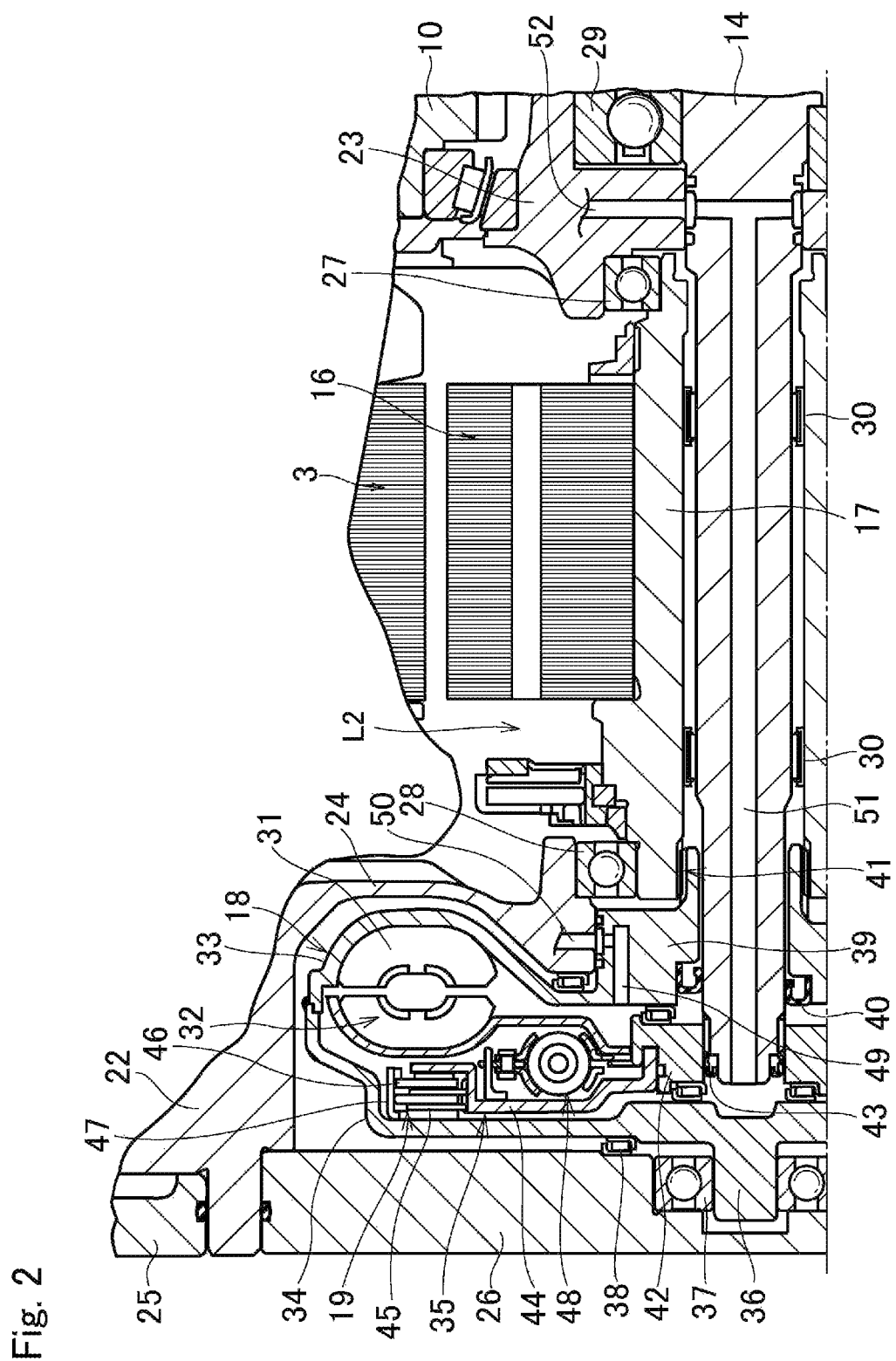
FIG. 2 is a partial cross-sectional view showing one example of a second transmission route.

FIG. 2 is a cross-sectional view showing a main part of the second transmission route L2 including the fluid coupling 18 and the lockup clutch 19. The rotor shaft 17 is a cylindrical shaft, and one end of the rotor shaft 17 is supported by the bulkhead 23 though a bearing 27. Other end of the rotor shaft 17 is supported by the bulkhead 24 though a bearing 28. The intermediate shaft 14 is inserted into the rotor shaft 17 along a center axis, and a bearing 29 is fitted onto the intermediate shaft 14 at a portion between the bulkhead 23 and the housing 20 so as to support the intermediate shaft 14 by the bulkhead 23 through the bearing 29. In addition, a plurality of needle bearings 30 are arranged between an outer circumferential face of the intermediate shaft 14 and an inner circumferential face of the rotor shaft 17.

A left end (as will be also called the "leading end") of the intermediate shaft 14 in FIG. 2 protrudes toward the rear adapter 26 through the bulkhead 24 of the rear case 22, and the fluid coupling 18 and the lockup clutch 19 are connected to the leading end of the intermediate shaft 14. In the fluid coupling 18, a turbine runner 32 as a driven member is rotated by a spiral flow created by a pump impeller 31 as a drive member. A cover 34 is joined to an outer circumferential end of a pump shell 33 of the pump impeller 31 thereby forming a housing of the fluid coupling 18. The cover 34 includes an annular plate member 35 formed along an inner face of the rear adapter 26. A bearing 37 is fitted onto a protrusion 36 formed at a center of the plate member 35 to rotatably support the cover 34 by the rear adapter 26 through the bearing 37. In addition, a thrust bearing 38 is interposed between the plate member 35 and the rear adapter 26.

Specifically, the pump shell 33 is formed into an annular shape, and a boss 39 is formed integrally with an inner circumferential end. The boss 39 is inserted into a clearance between an inner circumferential end of the bulkhead 24 and the outer circumferential face of the intermediate shaft 14. Specifically, the boss 39 is contacted to the inner circumferential end of the bulkhead 24 in a slidable manner, and fitted onto the outer circumferential face of the intermediate shaft 14 while keeping a slight clearance therebetween. A sealing member 40 is interposed between the boss 39 and the intermediate shaft 14 in a liquid tight manner. The boss 39 (i.e., the pump impeller 31) is connected to the rotor shaft 17 through a spline 41.

The leading end of the intermediate shaft 14 protrudes toward the cover 34 through the boss 39, and a hub 42 is splined onto the leading end of the intermediate shaft 14. A sealing member 43 is interposed between the intermediate shaft 14 and the hub 42 to separate an area between the hub 42 and the cover 34 and an area of the hub 42 and the boss 39 side liquid-tightly. That is, the turbine runner 32 is connected to the intermediate shaft 14 through a spline.

The turbine runner 32 is connected to the hub 42 to be rotated integrally therewith. The lockup clutch 19 as an engagement element of the embodiment is interposed between the turbine runner 32 and the inner face of the cover 34 in a radially outer side. Specifically, the lockup clutch is a friction clutch comprising a piston 44 fitted onto the hub 42 in a rotatable manner while being allowed to reciprocate in an axial direction, and a plurality of clutch discs 45 splined to a cylindrical portion formed on an outer circumferential side of the piston 44. An outer circumferential portion of the piston 44 expands radially outwardly in parallel to the clutch discs 45 to form a disc portion for pushing the clutch discs 45 in a thickness direction (i.e., in the axial direction). A sealing member such as an O-ring is interposed between the piston 44 and the hub 42 to divide both sides of the piston 44 in the axial direction liquid-tightly.

A clutch plate(s) 46 arranged alternately with the clutch discs 45 is/are splined to a retainer 47 attached to an inner face of the cover 34. Accordingly, when a hydraulic pressure between the piston 44 and the inner face of the cover 34 is higher than a hydraulic pressure in a back side of the piston 44 (i.e., in the turbine runner 32 side), the piston 44 is withdrawn from the inner face of the cover 34. Consequently, a contact pressure between the clutch disc 45 and the clutch plate 46 is reduced to substantially zero so that the lockup clutch 19 is brought into disengagement to interrupt torque transmission. By contrast, when the hydraulic pressure between the piston 44 and the inner face of the cover 34 is lower than the hydraulic pressure in the back side of the piston 44 (i.e., in the turbine runner 32 side), the piston 44 is pushed toward the inner face of the cover 34. Consequently, the contact pressure between the clutch disc 45 and the clutch plate 46 is increased so that the lockup clutch 19 is brought into engagement to transmit a torque. Thus, the lockup clutch 19 is adapted to selectively connect the pump impeller 31 to the intermediate shaft 14.

In order to suppress torsional vibrations, a spring damper device 48 is arranged between the lockup clutch 19 and the hub 42. In the spring damper 48, coil springs are arranged in a circumferential direction between a drive member and a driven member.

Here will be explained an oil passage for supplying oil to the fluid coupling 18 and to supply and discharge the oil to engage and disengage the lockup clutch 19. An oil passage 49 is formed in the boss 39. In the oil passage 49, one of openings opens toward the turbine runner 32, and the other opening opens toward the inner circumferential face of the bulkhead 24 through the outer circumferential face of the boss 39 contacted slidably thereto. A groove is formed on all around the outer circumferential face of the boss 39 from both sides of the other opening of the oil passage 49, and an oil passage 50 penetrating through the bulkhead 24 is connected to the other opening of the oil passage 49. In addition, seal rings are arranged on both sides of the groove to connect the oil passage 49 to the oil passage 50 without causing a leakage. Accordingly, the oil passage 50 serves as a first oil passage of the embodiment.

An oil passage 51 is formed along the axial center of the intermediate shaft 14 to a leading end of the intermediate shaft 14. The oil passage 51 serves as a second oil passage of the embodiment, and opens toward the space (i.e., the chamber) between the piston 44 of the lockup clutch 19 and the inner face of the cover 34. The other opening of the oil passage 51 opens toward the inner circumferential face of the bulkhead 23 contacted slidably to the outer circumferential face of the intermediate shaft 14. A groove is formed on all around the outer circumferential face of the intermediate shaft 14 from both sides of the other opening of the oil passage 51, and an oil passage 52 penetrating through the bulkhead 23 is connected to the other opening of the oil passage 51. In addition, seal rings are arranged on both sides of the groove to connect the oil passage 51 to the oil passage 52 without causing a leakage. Accordingly, the oil passage 52 serves as a third oil passage of the embodiment.

The oil passage 50 formed in the bulkhead 24 and the oil passage 52 formed in the bulkhead 23 are connected to not shown elements such as a hydraulic control unit, an oil cooler, and an oil pump, and the oil is circulated between the fluid coupling 18 and the oil cooler and so on through the oil passages 50 and 52. Accordingly, the lockup clutch 19 is engaged by increasing the hydraulic pressure in the oil passage 50 of the bulkhead 24 to be higher than that in the oil passage 52 of the bulkhead 23, and by contrast, the lockup clutch 19 is disengaged by reducing the hydraulic pressure in the oil passage 50 of the bulkhead 24 to be lower than that in the oil passage 52 of the bulkhead 23.

Here, although not especially illustrated in the drawings, the first motor-generator 2 and the second motor-generator 3 are connected to an electrical power source including a battery and an inverter or converter. Therefore, electricity generated by the first motor-generator 2 may be supplied to the second motor-generator 3, electricity accumulated in the battery may be supplied to the first motor-generator 2 and the second motor-generator 3, and electricity generated by the first motor-generator 2 and the second motor-generator 3 may be accumulated in the battery. In addition, as shown in FIG. 2, bearing members are arranged between members rotated relatively.

In the hybrid vehicle having the powertrain shown in FIGS. 1 and 2, the drive force generated by the engine 1 is delivered to the drive wheels 13 through the first transmission route L1, and the drive force generated by the second motor-generator 3 is delivered to the drive wheels 13 through the second transmission route L2. Although the first transmission route L1 and the second transmission route L2 merge into each other at the driven gear 9 to be integrated in the downstream, those routes are separated from each other. That is, the drive force of the engine 1 will not be applied to the second motor-generator 3 and the fluid coupling 18. The operating mode of the hybrid vehicle is switched by selecting the first transmission route L1 and the second transmission route L2 according to need.

For example, in a hybrid mode, a torque generated by the engine 1 is delivered partially to the drive wheels 13 through the first transmission route L1 including the overdrive mechanism 4, the power split mechanism 5, and the countershaft 8. In addition, the first motor-generator 2 is driven by the engine 1 to generate electricity, and the electricity generated by the first motor-generator 2 is supplied to the second motor-generator 3 to generate torque so that the torque generated by the second motor-generator 3 is delivered to the drive wheels 13 through the second transmission route L2.

In a series mode, the first motor-generator 2 can be driven as a generator by the engine 1 while disengaging the first clutch C1 and the brake B1 and engaging the second clutch C2. In this situation, the carrier C5 of the power split mechanism 5 is idled and hence the output gear 7 does not deliver the torque, and the second motor-generator 3 is driven by the electricity generated by the first motor-generator 2. The drive force generated by the second motor-generator 3 is delivered to the drive wheels 13 through the second transmission route L2 so that the hybrid vehicle is propelled by the drive force generated by the second motor-generator 3.

In an electric vehicle (EV) mode, electricity accumulated in the battery is supplied to the second motor-generator 3, or to the second motor-generator 3 and the first motor-generator 2 so that the hybrid vehicle is propelled by the drive force generated by the first motor-generator 2 and the second motor-generator 3.

Figure 3:
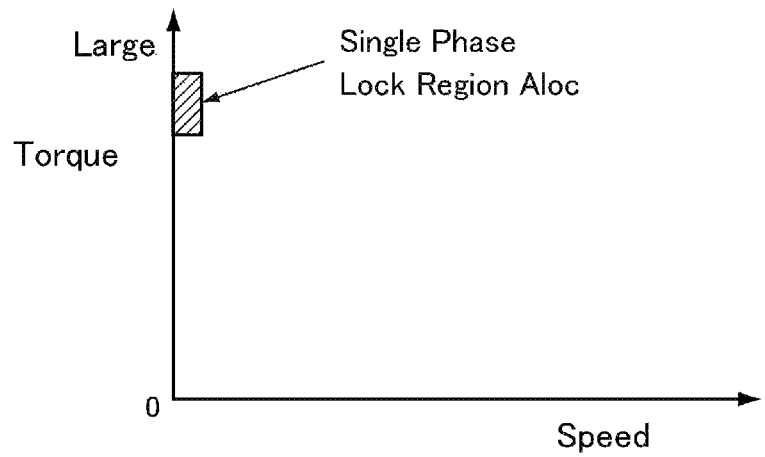
FIG. 3 is a view schematically showing one example of a map determining a region of the single phase lock.

When using the second motor-generator 3 as a prime mover to propel the hybrid vehicle in any of the above-mentioned mode, a single phase lock of the second motor-generator 3 may be caused depending on a rotational speed and a required drive force. Given that a synchronous motor is used as the second motor-generator 3, a coil of any of a phase may be heated by excessive current to achieve the required drive force. Such phenomenon is called the single phase lock. An occurrence of the single phase lock may be expected or predicted with reference to a map determining a region Aloc where the single phase lock occurs, based on a rotational speed and a required drive force. An example of the map is shown in FIG. 3, and the region Aloc is defined below the maximum torque of the second motor-generator 3. In addition, when the hybrid vehicle travels on an off-road such as a muddy road and an uneven road, an off-road switch would be turned on to optimize the drive force to travel on the off-road. In this case, the rotational speed is suppressed while increasing the torque and this increases the probability of the occurrence of the single phase lock. For this reason, an occurrence of the single phase lock may also be predicted based on a fact that the off-road switch is turned on.

Figure 4:
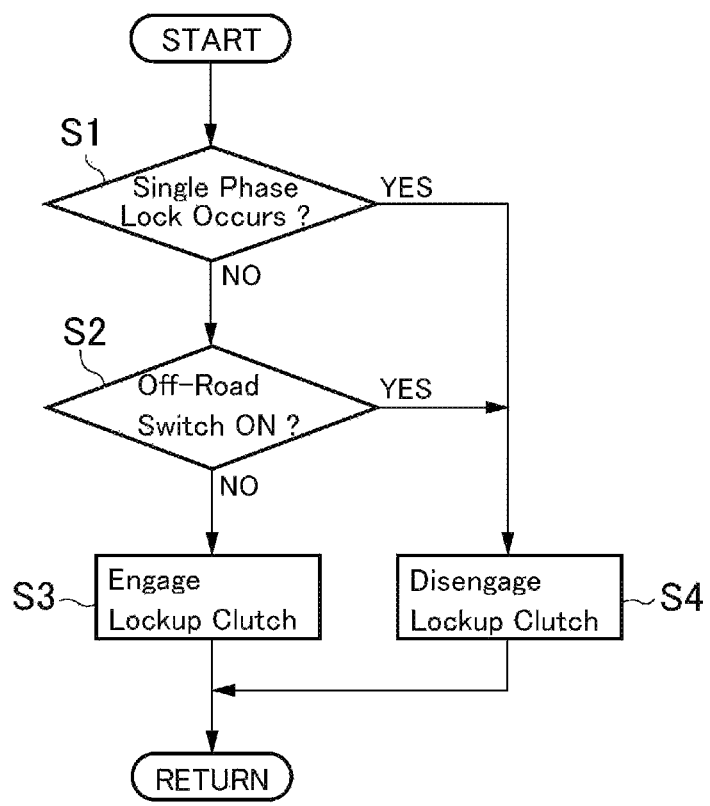
FIG. 4 is a flowchart showing an example of a routine to engage and disengage the lockup clutch.

Thus, the single phase lock may be caused when rotating the motor at a low speed. In order to avoid the occurrence of the single phase lock, in the hybrid vehicle according to the embodiment, the second motor-generator 3 is allowed to be rotated at a high speed by disengaging the lockup clutch 19. For this purpose, a routine shown in FIG. 4 is executed, and the routine shown in FIG. 4 is repeated as long as the hybrid vehicle is in a condition possible to be launched or the hybrid vehicle is propelled. First of all, a possibility of the occurrence of the single phase lock is determined with reference to the map shown in FIG. 3 (at step S1). If the answer of step S1 is NO, it is determined whether or not the off-road switch is turned on (at step S2). If the answer of step S2 is NO, the lockup clutch 19 is engaged (at step S3), and thereafter the routine returns. Thus, when the hybrid vehicle is stopped, or when the hybrid vehicle is propelled at a low speed and hence the large drive force is not especially demanded, the lockup clutch 19 is engaged.

By contrast, if the answer of step S1 is YES, or if the answer of step S2 is YES, the lockup clutch 19 is disengaged to cause a differential rotation (at step S4), and thereafter the routine returns. Thus, when the occurrence of the single phase lock in the second motor-generator 3 is expected or predicted, the second motor-generator 3 is allowed to be rotated at a speed higher than the region Aloc by transmitting the torque through the fluid coupling 18 while causing a slip.

For example, when launching the hybrid on an uphill road, the second motor-generator 3 is required to generate a large torque at a low speed, and hence the probability of the occurrence of the single phase lock is increased. In this case, the lockup clutch 19 is disengaged to transmit the torque of the second motor-generator 3 to the intermediate shaft 14 through the fluid coupling 18. Since the fluid coupling 18 transmits the torque through the oil, the pump impeller 31 and the turbine runner 32 are allowed to rotate relatively to each other. For this reason, even if the turbine runner 32 almost stops together with the intermediate shaft 14 when launching the hybrid vehicle, the second motor-generator 3 is allowed to rotate together with the pump impeller 31. Consequently, the rotational speed of the second motor-generator 3 is raised higher than the region Aloc. That is, a relative rotational speed to an output shaft speed of the second motor-generator 3 (i.e., a speed of the output gear 13 or the drive wheel 13) is increased. As a result, the occurrence of the single phase lock in the second motor-generator 3 can be prevented. In addition, since the fluid coupling 18 transmits the torque in accordance with the relative rotational speeds between the pump impeller 31 and the turbine runner 32, the drive torque applied to the drive wheels 13 is increased with an increase in the output of the second motor-generator 3, and hence the hybrid vehicle can be launched even on the uphill road.

When the relative rotation between the pump impeller 31 and the turbine runner 32 is caused in the fluid coupling 18, the oil is agitated or sheared intensively to generate heat. However, since the oil is circulated between the fluid coupling 18 and an external device such as the oil cooler, the heat of the oil is transported to outside of the fluid coupling 18. For this reason, temperature rise in the fluid coupling 18 and auxiliaries can be suppressed to limit damage.

In addition, following advantages may be achieved by the drive unit according to the embodiment of the present disclosure. The fluid coupling 18 is disposed on the intermediate shaft 14 extending parallel to the input shaft 6, and serves as a part of the second transmission route L2.

Therefore, even if the engine 1 generates the drive force in addition to the second motor-generator 3, the drive force generated by the engine 1 will not be applied to the fluid coupling 18. For this reason, according to the embodiment of the present disclosure, the fluid coupling 18 may be downsized to transmit only the torque of the second motor-generator 3 thereby downsizing the drive unit entirely.

In addition, the foregoing drive unit is a multiple-shaft type drive unit in which the intermediate shaft 14 extends parallel to the input shaft 6, and the fluid coupling 18, the second motor-generator 3, and the lockup clutch 19 are disposed on the intermediate shaft 14. Therefore, number of parts arranged on the rotational center axis of the engine 1 can be reduced to reduce an axial length.

Further, in the foregoing drive unit, the lockup clutch 19, the fluid coupling 18, the second motor-generator 3 as a prime mover, the output gear 15 as an output member are arranged in order from the left side of FIG. 1 on the intermediate shaft 14 as a part of the second transmission route L2. In addition, the rotor shaft 17 is arranged in the outer circumferential side of the intermediate shaft 14, and the rotor 16 is connected to the pump impeller 31 through the rotor shaft 17. That is, the turbine runner 32, the lockup clutch 19, and the spring damper 48 are connected to the intermediate shaft 14 situated in the innermost side, and hence restrictions on inner diameters of those members may be reduced. For this reason, outer diameters of the turbine runner 32, the lockup clutch 19, and the spring damper 48 may be reduced to downsize those members. In other words, number of members overlapped in the radial direction can be reduced to simplify the structure of the drive unit thereby downsizing the drive unit.

As explained with reference to FIG. 2, the fluid coupling 18 and the lockup clutch 19 are held in the rear case 22. In addition, the pump impeller 31 is connected to the rotor shaft 17 supported by the bulkhead 24 through the spline 41, and the turbine runner 32 is connected to the intermediate shaft 14 by splining the hub 42 integrated therewith onto the leading end of the intermediate shaft 14. Further, the opening of the rear case 22 opposed to the leading end of the intermediate shaft 14 is closed by the rear adapter 26 liquid-tightly. Here, a diameter of the opening or an outer diameter of the rear adapter 26 is larger than an outer diameter of the fluid coupling 18. Accordingly, when assembling the drive unit, the above-mentioned members are inserted in order into the housing 20 or the spaces (or the chambers) defined by the bulkheads 23 and 24. Meanwhile, the fluid coupling 18, the spring damper 48, and the lockup clutch 19 are assembled into a unit. The unit of the fluid coupling 18 is inserted into the rear case 22 from the opening from which the rear adapter 26 is detached, while engaging the boss 39 with the inner circumferential face of the bulkhead 24 and splining to the spline 41, and while splining the hub 42 onto the intermediate shaft 14. Thereafter the opening is closed by the rear adapter 26. In this situation, the protrusion 36 formed on the cover 34 is fitted into the bearing 37, or the bearing 37 fitted onto the protrusion 36 is fitted with the rear adapter 26.

Thus, in the drive unit, the fluid coupling 18 and the lockup clutch 19 are disposed adjacent to the inner face of the rear case 22, and the fluid coupling 18 and the lockup clutch 19 are fitted onto the rotor shaft 17 and the intermediate shaft 14 supported by the bulkhead 24 integrated with the rear case 22 directly or indirectly. In addition, the portion of the rear case 22 opposed to the intermediate shaft 14 may be opened and closed. For this reason, the fluid coupling 18 and the lockup clutch 19 may be inserted into the rear case 22 after inserting the other members. That is, the drive unit may be assembled easily. Given that the leading end of the intermediate shaft 14 is supported upwardly by a specific jig, the drive unit may be assembled further easily by inserting the unit of the fluid coupling 18 and the thrust bearings into the rear case 22 in order while fitting onto the intermediate shaft 14 and splining to the spline 41.

As described, the heat of the fluid coupling 18 is transported to the outside by the oil, and the lockup clutch 19 is engaged and disengaged hydraulically. Specifically, feeding, discharging, and circulation of the oil are carried out through the oil passages 49 to 52. In the drive unit, specifically, the oil passage 50 is formed in the bulkhead 23 integrated with the middle case 21, and the oil passage 52 is formed in the bulkhead 24 integrated with the rear case 22. For this reason, number of leakage sites can be reduced and hence number of sites to be sealed can be reduced. Consequently, a power loss resulting from oil leakage, number of parts, and man-hour to assemble the drive unit can be reduced. In addition, since the oil passages 50 and 52 can be formed together with the bulkheads 23 and 24, complex post-process for forming the oil passages can be omitted.

Further, one of the oil passages for feeding and discharging the oil to/from the fluid coupling 18 is formed inside of the intermediate shaft 14. In other words, even if the fluid coupling 18 is disposed close to the rear case 22, the oil can be supplied and discharged to/from the fluid coupling 18. For this reason, the detachable rear adapter 26 of the rear case 22 can be employed without complicating a structure of the oil circulation route. Thus, according to the embodiment of the present disclosure, the drive unit can be assembled easily and an arrangement of the oil passages can be simplified.

The present disclosure should not be limited to the foregoing embodiment. In short, the present disclosure is configured to avoid the single phase lock of the motor for generating the drive force to propel the vehicle by disposing the fluid coupling between the motor and the drive wheels. Accordingly, the present disclosure may also be applied to a vehicle in which only a motor is used as a prime mover instead of an engine.

Figure 5:
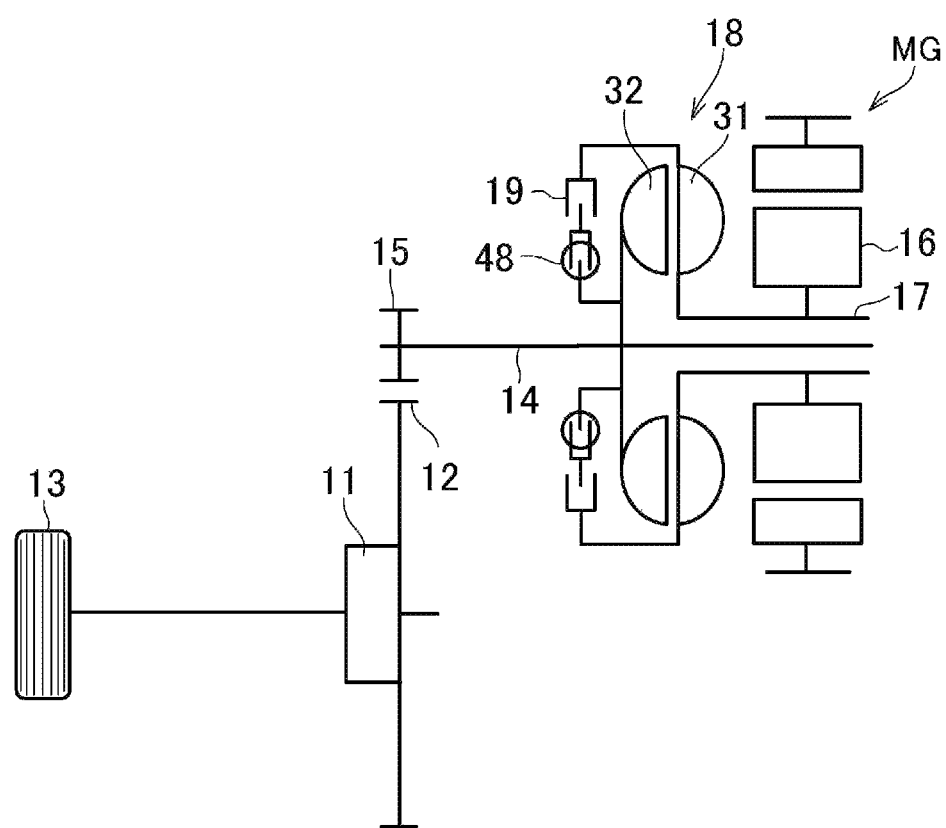
FIG. 5 is a skeleton diagram schematically showing another embodiment of the present disclosure.

An example of such vehicle is schematically shown in FIG. 5. In the example shown in FIG. 5, the fluid coupling 18 having the lockup clutch 19 is connected to an output side of a motor-generator MG as a prime mover. The turbine runner 32 is connected to the output gear 7, and the output gear 7 is meshed with the ring gear 12 of the differential gear set 11 for distributing a torque to the right drive wheel 13 and the left drive wheel 13. In FIG. 5, common reference numerals are allotted to the elements in common with those shown in FIGS. 1 and 2, and detailed explanations therefor will be omitted The routine shown in FIG. 4 may also be executed in the vehicle shown in FIG. 5. Specifically, when the occurrence of the single phase lock in the motor-generator MG is expected, a relative rotation between the pump impeller 31 and the turbine runner 32, that is, a slip is caused by disengaging the lockup clutch 19. Consequently, a rotational speed of the motor-generator MG is raised higher than that in the region Aloc to avoid the occurrence of the single phase lock. Here, the shaft support structure and the arrangement of the oil passage shown in FIGS. 1 and 2 may also be applied to the example shown in FIG. 5 in which only the motor-generator MG is employed as a prime mover.

In addition, a torque converter that can amplify the torque in accordance with a speed ratio between a pump impeller and a turbine runner may also be used as the fluid coupling.

According to the present disclosure, the engagement element such as the lockup clutch 19 may be omitted. Further, according to the present disclosure, a differential mechanism other than the single-pinion planetary gear set may also be used as the power split mechanism. Furthermore, the overdrive mechanism may be omitted to apply the engine power directly to the power split mechanism.

The invention claimed is:

1. A drive unit for a vehicle, comprising:
a first transmission route to deliver a drive force generated by an engine to drive wheels; and
a second transmission route to deliver a drive force generated by a rotating electrical machine to the drive wheels, wherein:
the second transmission route comprises an intermediate shaft that transmits the drive force generated by the rotating electrical machine to the first transmission route, and
a fluid coupling is disposed between the rotating electrical machine and the intermediate shaft.

2. The drive unit for a vehicle as claimed in claim 1, wherein:
the first transmission route comprises an input shaft extending coaxially with a rotational center axis of the engine,
the intermediate shaft extends parallel to the input shaft,
a rear case is situated on a leading end side of the input shaft and the intermediate shaft that is opposite to the engine in an axial direction, and
the fluid coupling is connected to a leading end portion of the intermediate shaft while being adjacent to an inner face of the rear case.

3. The drive unit for a vehicle as claimed in claim 2, wherein a rear adapter that is diametrically larger than the fluid coupling is attached detachably to the rear case to close a portion of the rear case opposed to a leading end of the intermediate shaft.

4. The drive unit for a vehicle as claimed in claim 1, wherein an engagement element that is engaged to transmit the drive force and disengaged to interrupt transmission of the drive force is arranged parallel to the fluid coupling between the rotating electrical machine and the intermediate shaft.

5. The drive unit for a vehicle as claimed in claim 4, wherein:
the rotating electrical machine comprises a rotor shaft,
the intermediate shaft penetrates through the rotor shaft along a rotational center axis of the rotor shaft,
the fluid coupling comprises a pump impeller connected to the rotor shaft and a turbine runner connected to the intermediate shaft,
the engagement element is disposed in such a manner as to selectively connect the pump impeller and the intermediate shaft,
the engagement element, the fluid coupling, and the rotating electrical machine are arranged in order on the intermediate shaft, and
an output member that delivers the drive force generated by the rotating electrical machine to the drive wheels is disposed on an other end portion of the intermediate shaft that is opposite to a leading end portion of the intermediate shaft to which the fluid coupling is connected.

6. The drive unit for a vehicle as claimed in claim 5, wherein the pump impeller is connected to the rotor shaft through a spline.

7. The drive unit for a vehicle as claimed in claim 5, wherein the turbine runner is connected to the intermediate shaft through a spline.

8. The drive unit for a vehicle as claimed claim 5, further comprising:
a casing that holds the first transmission route and the second transmission route, wherein:
a first bulkhead that supports the rotor shaft is formed in the casing, and the fluid coupling is contacted to the first bulkhead in a rotatable and slidable manner, and
a first oil passage is formed in the first bulkhead to feed and discharge oil to/from the fluid coupling.

9. The drive unit for a vehicle as claimed in claim 8, wherein:
a second bulkhead that supports the intermediate shaft is formed in the casing, and the intermediate shaft is contacted to the second bulkhead in a rotatable and slidable manner, and
a third oil passage is formed in the second bulkhead to be connected to the second oil passage.

10. The drive unit for a vehicle as claimed in claim 1, wherein a second oil passage is formed in the intermediate shaft along an axial direction of the intermediate shaft to feed and discharge oil to/from the fluid coupling.

11. The drive unit for a vehicle as claimed in claim 1, wherein:
the first transmission route further comprises: a power split mechanism that performs a differential action among a first rotary element, a second rotary element, and a third rotary element; and another rotating electrical machine, and
a power of the engine is transmitted to the first rotary element, a power of said another rotating electrical machine is transmitted to the second rotary element, and the drive force is delivered from the third rotary element to the drive wheels.

* * * * *